United States Patent [19]

Kuroki et al.

[11] Patent Number: 4,675,815
[45] Date of Patent: Jun. 23, 1987

[54] TRANSACTION SAFETY SYSTEM FOR FALSELY INDICATING SUCCESSFUL COMPLETION OF ILLEGAL TRANSACTION

[75] Inventors: Akira Kuroki; Satoru Ochiai, both of Inagi, Japan

[73] Assignee: Fujitsu Limited, Kawasaki, Japan

[21] Appl. No.: 577,999

[22] Filed: Feb. 8, 1984

[30] Foreign Application Priority Data

Feb. 18, 1983 [JP] Japan .................. 58-025728

[51] Int. Cl.⁴ .................. G06F 15/20; G06F 1/00; G06K 5/00; H04L 9/00
[52] U.S. Cl. .................. 379/37; 235/380; 364/200; 364/408; 340/574; 340/825.32; 379/37; 379/95; 380/24
[58] Field of Search .............. 364/408, 401, 200, 900, 364/184, 185; 235/379, 380, 381, 382; 178/22.01, 22.08, 22.09; 340/825.31, 825.34

[56] References Cited

U.S. PATENT DOCUMENTS

| | | | |
|---|---|---|---|
| 4,023,013 | 5/1977 | Kinker | 340/825.34 |
| 4,234,932 | 11/1980 | Gorgens | 364/408 X |
| 4,259,720 | 3/1981 | Campbell | 364/200 |
| 4,310,720 | 1/1982 | Check, Jr. | 178/22.08 |
| 4,375,032 | 2/1983 | Uchida | 235/380 |
| 4,376,978 | 3/1983 | Musmanno | 364/900 |
| 4,386,266 | 5/1983 | Chesarek | 235/380 |
| 4,390,968 | 6/1983 | Hennessy | 364/408 |
| 4,438,824 | 3/1984 | Mueller-Schloer | 178/22.08 |
| 4,482,802 | 11/1984 | Aizawa | 235/380 |
| 4,484,306 | 11/1984 | Kulczyckyj | 364/900 |
| 4,513,393 | 4/1985 | Edlund et al. | 364/408 X |

Primary Examiner—Charles E. Atkinson
Assistant Examiner—Jon D. Grossman
Attorney, Agent, or Firm—Staas & Halsey

[57] ABSTRACT

A transaction device, having an input portion, and a processing device, having a client file, which is located at a processing center, are connected by a telephone line for processing data input on the transaction device. The transaction device sends an alarm signal when a transaction is carried out under duress via the transaction device. The updating of the client file is prevented when the alarm signal is received at the processing center and a false funds received processing text is sent to the transaction device indicating that the client file was updated.

11 Claims, 19 Drawing Figures

Fig. 3A

| Fig. 3 | |
|---|---|
| Fig. 3A | Fig. 3B |

Ten Key 29: 7, 8, 9, 4, 5, 6, 1, 2, 3, 0, ., —

CLEAR, ◀, ▶, ., ,

ITEM CODE, RECEIPTS

TRANSACTION CODE, PAYING

ACCOUNT NO., RECEIVED AMOUNT, PAYING IN

BALANCE DEPOSIT NO., ANOTHER BRANCH CODE, ENTER

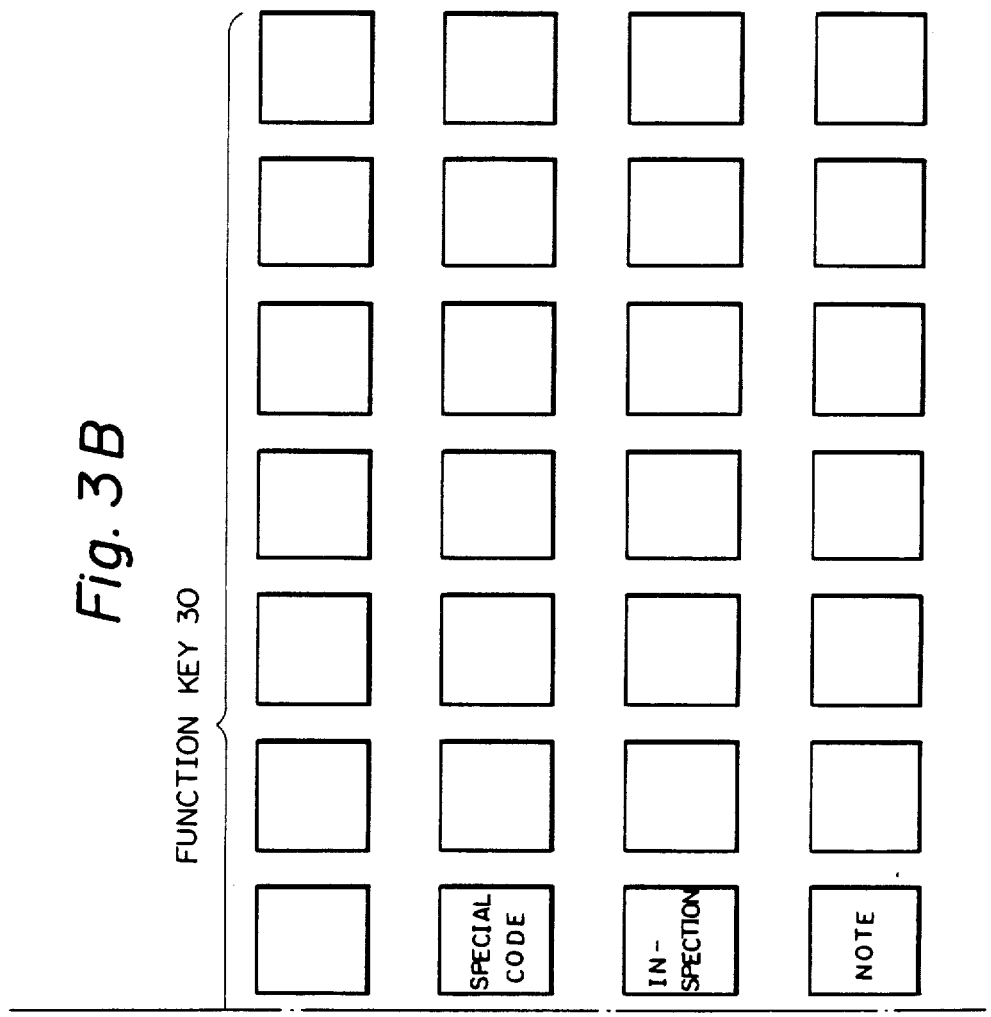

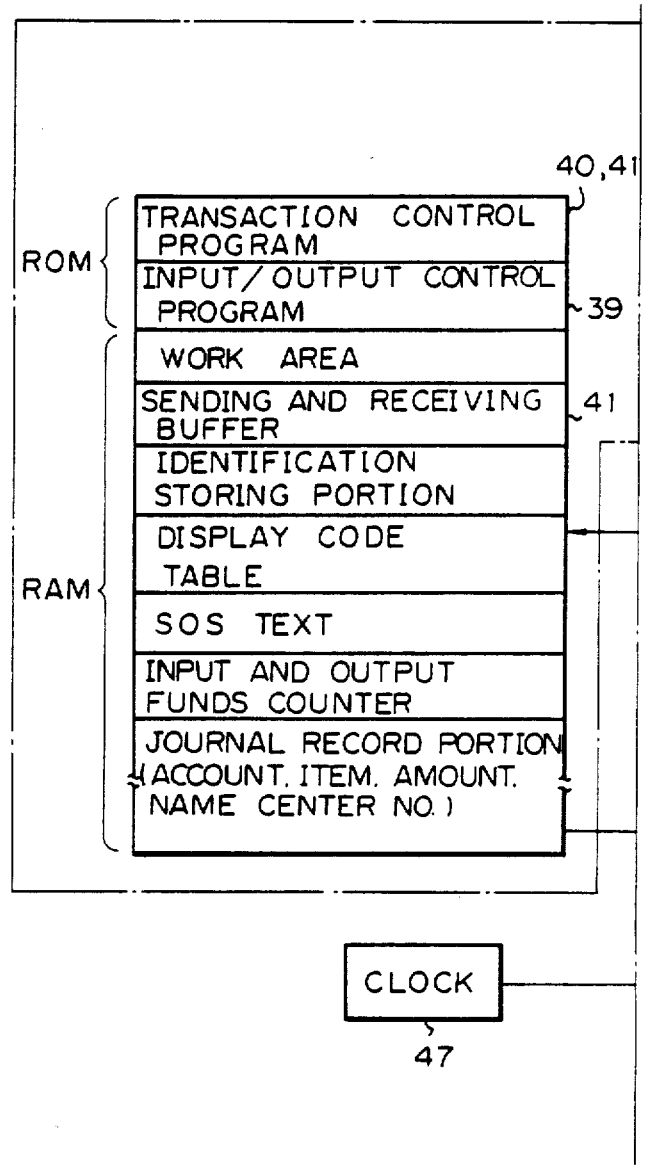

Fig. 7A

| ACCOUNT NO. | ADDRESS | NAME |
|---|---|---|

| ACCOUNT NO. | BALANCE | UNRENEWED DATA |
|---|---|---|
| A | " | " |
| B | " | " |
|  |  |  |

Fig. 7B

| DEFECTIVE ACCOUNT NO. | ACC. DENT, CARD LOST, DEFECTIVE ITEM |
|---|---|
| A |  |
| B |  |
|  |  |

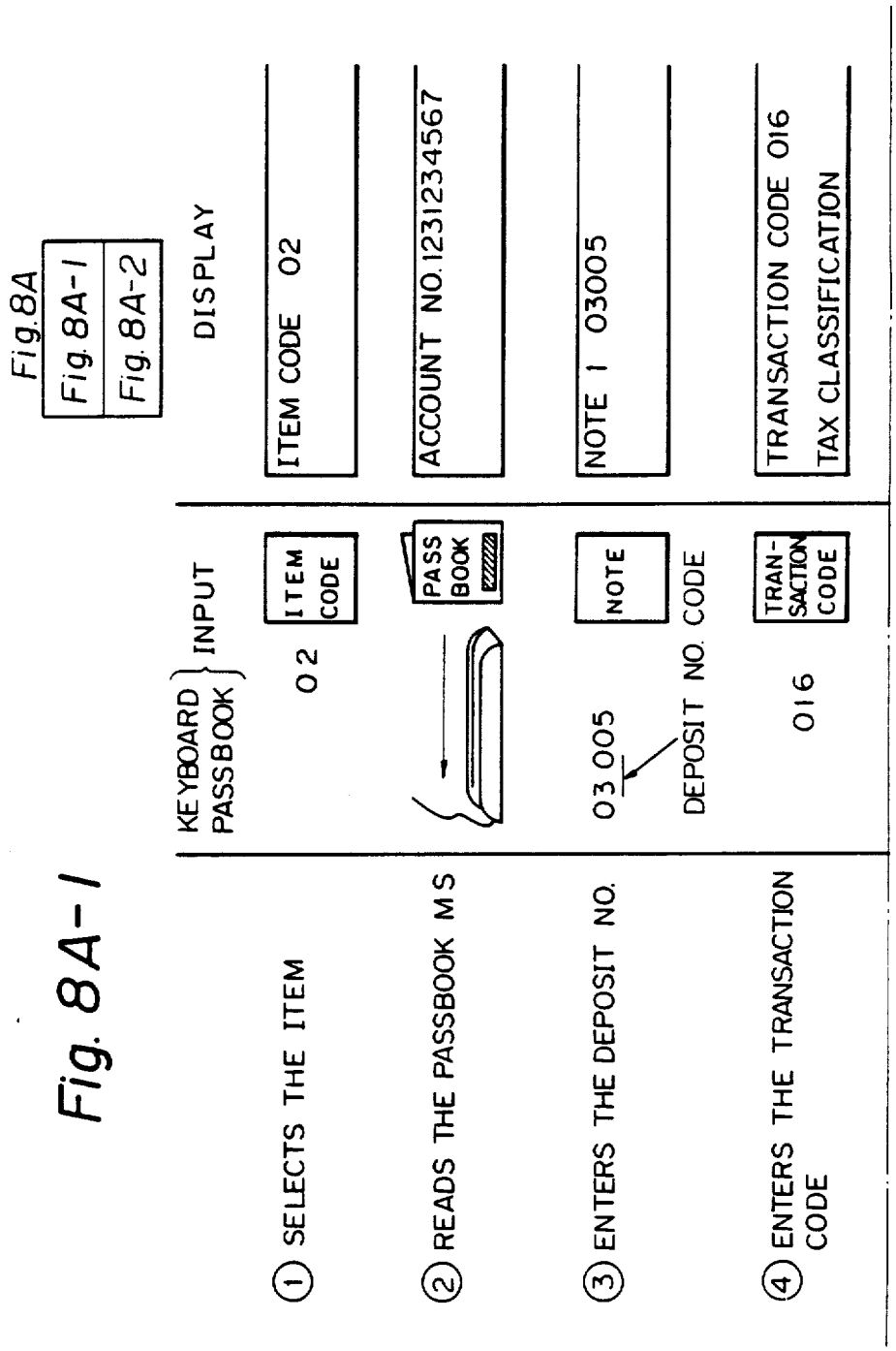

*Fig. 8A-2*

| | | |
|---|---|---|
| ⑤ ENTERS THE TAX CLASSIFICATION | 3 [ENTER] | TAX CLASSIFICATION 3<br>TERM |
| ⑥ ENTERS THE TERM | 24551 [ENTER] | TERM 24551<br>DATA OF MATURITY |
| ⑦ ENTERS THE DATE OF MATURITY | 840401 [ENTER] | DATE OF MATURITY 84-04-01<br>CLASSIFICATION |
| ⑧ ENTERS TRANSACTION CLASSIFICATION | 1 [ENTER] | CLASSIFICATION 1 |
| ⑨ NO ITEM ENTERED SKIPS | [ENTER] | CLASSIFICATION 1<br>INITIAL DATE |

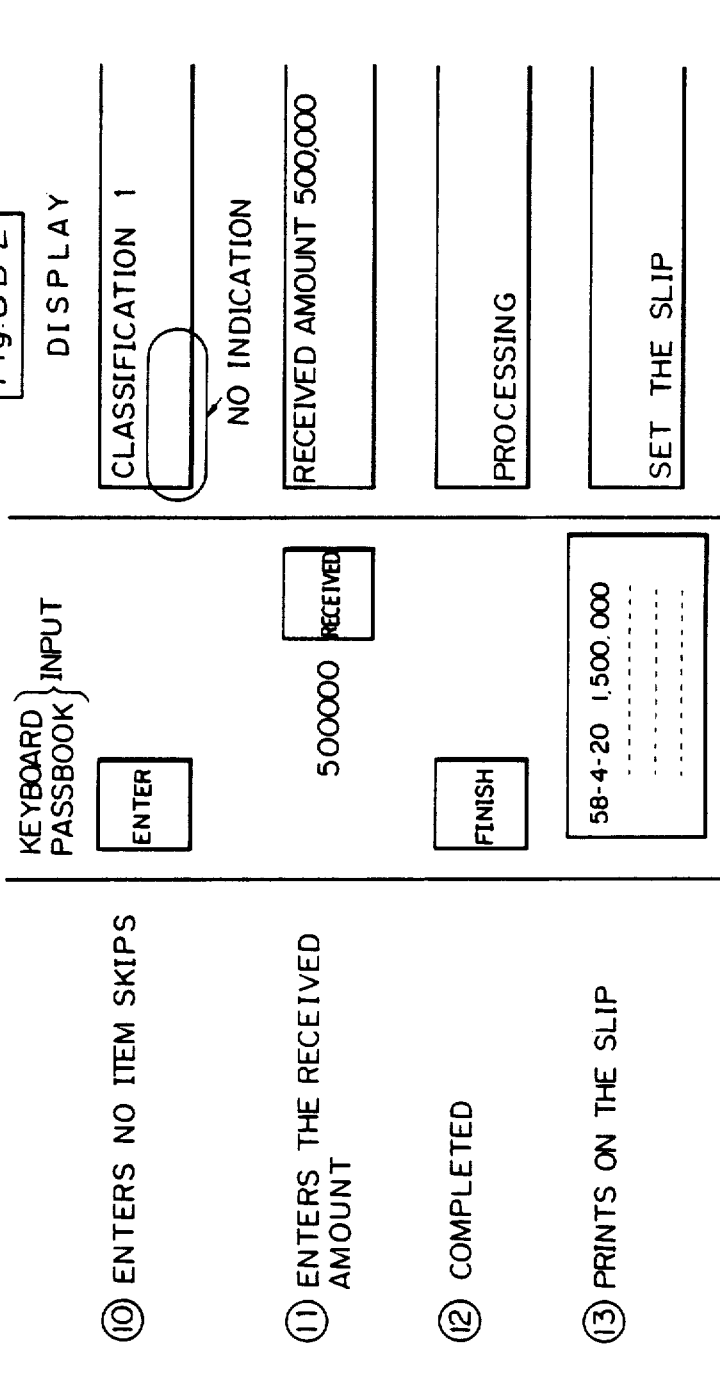

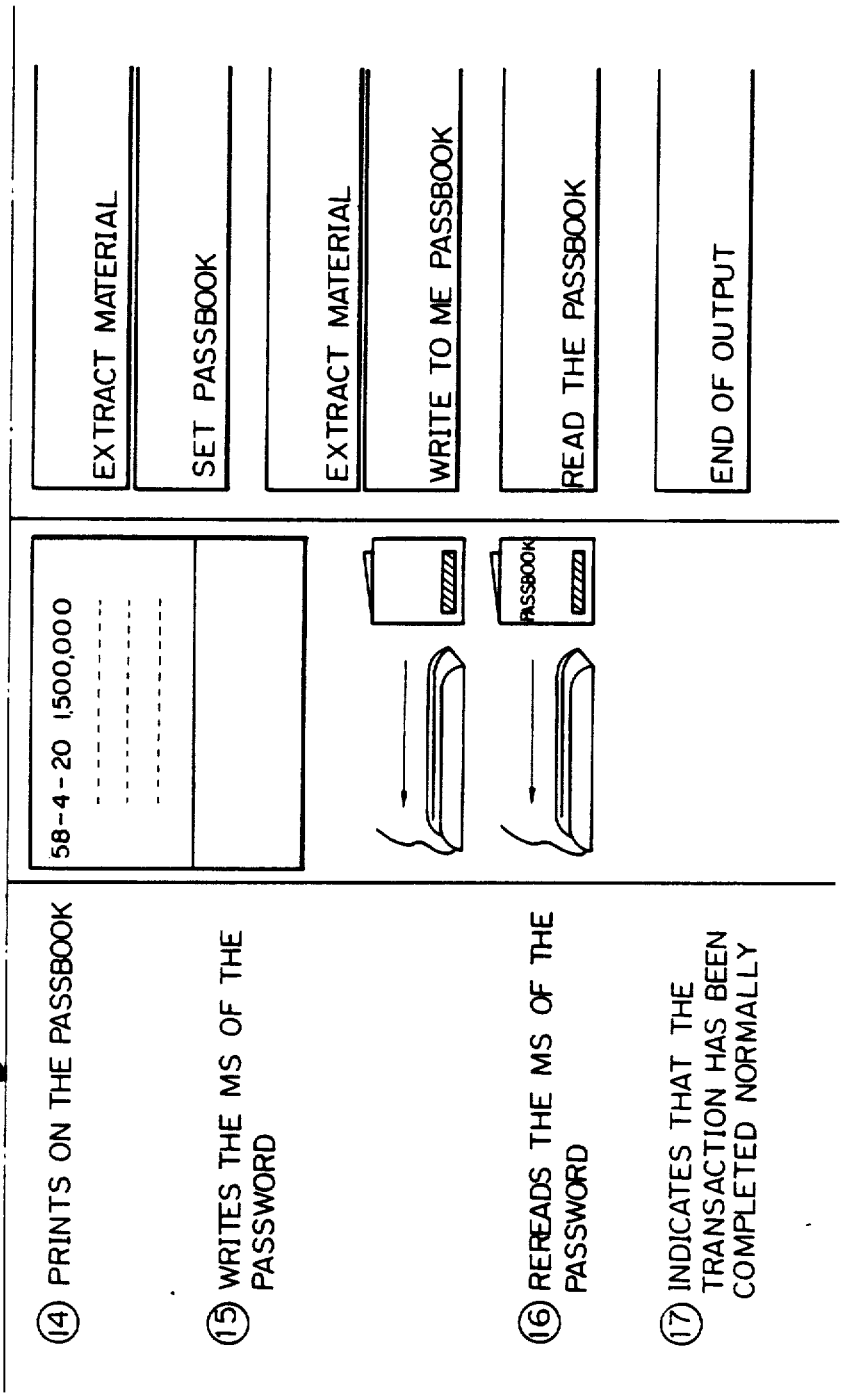

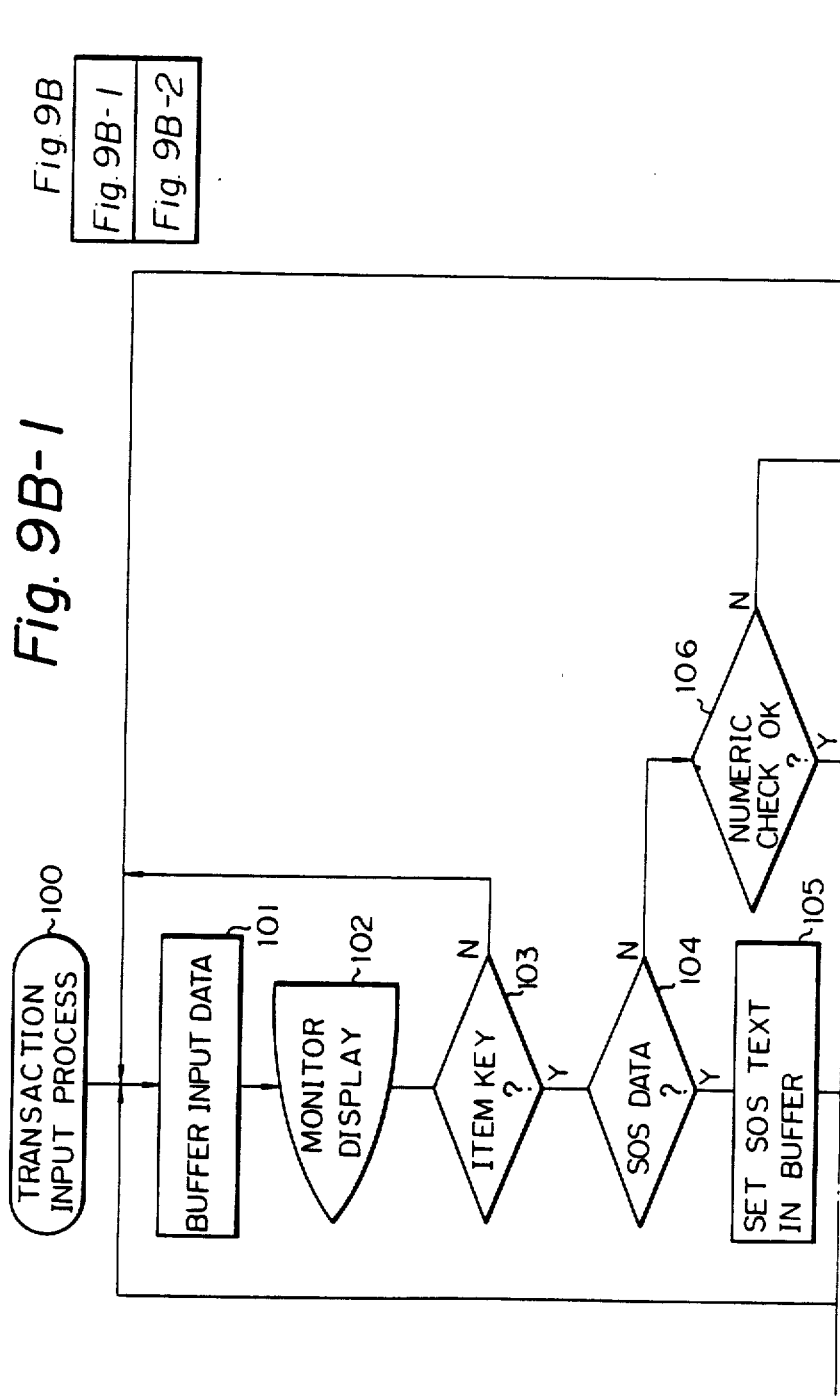

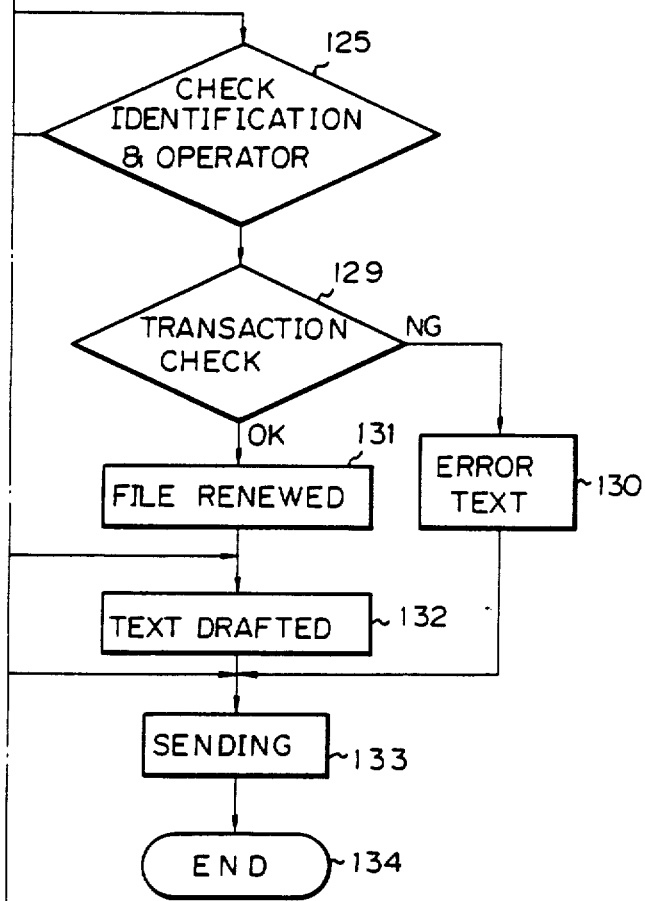

TRANSACTION SAFETY SYSTEM FOR FALSELY INDICATING SUCCESSFUL COMPLETION OF ILLEGAL TRANSACTION

BACKGROUND OF THE INVENTION

1. Field of the Invention

The present invention relates to a transaction safety system for securing the safety of a monetary transaction in a monetary circulation system.

2. Description of the Prior Art

When the staff of banks etc., visit clients to often carry out a monetary transaction, they carry a portable monetary transaction device. This enables the staff to carry out the processing of any monetary transaction with their clients immediately, from the client's premises. Thereby, a passbook in which a deposited value and a balance are printed out can be delivered to the client on the spot. This portable monetary transaction device is connected, via a telephone circuit and an acoustic coupler, to a central processing unit so that the monetary transaction process (funds received process) is carried out when the central processing unit receives the input data. After the monetary transaction process is completed, data transmitted from the central processing unit is printed out in the passbook by a printer incorporated in the transaction device. This method of processing by a portable monetary transaction device is normally carried out by the client liaison staff of a bank, and there is always a possibility of the staff being forced by a person with criminal intent, whether at the client's premises or during the journey to visit the client, to carry out the processing for the receipt of non-existent funds. That is, the staff may be forced to print out in a bank passbook an amount received without actually receiving this amount. Such a crime cannot be prevented by the conventional monetary transaction systems.

SUMMARY OF THE INVENTION

An object of the present invention is to prevent the above-mentioned criminal act from succeeding, and to provide a transaction safety system for securing the safety of a monetary transaction in a monetary circulation system.

The present invention is a system in which a monetary transaction device, having an input portion, and a processing device, having a client file, are connected to process data input on the monetary transaction device. The monetary transaction device includes part of a transaction safety system for sending an alarm signal when a transaction is carried out unwillingly, and file control is provided in the processing device for preventing updating of the client file when the alarm signal is received. In this system, when a special code is received from the input portion of the transaction device, an alarm signal is sent to the processing device, preventing update of the client file.

Further, in the present invention, in which a monetary transaction device, having an input portion, and a processing device, having a client file, are connected, to process data input on the transaction device, the transaction device includes a distingushing portion which distinguishes whether or not the data input on the input portion is a predetermined special code and a sending device which sends an alarm signal in response to the detection by the distinguishing portion of input containing the special code. The processing device includes an alarm generator which generates an alarm when the alarm signal is received from the monetary transaction device and a text sending device for sending text concerning the transaction to the monetary transaction device when the alarm signal is generated. Note, transaction device also receives text in a normal the monetary transaction, therefore the transaction always appears at the monetary transaction device to be completed.

Thus, as is clear from the above, in the event that the client liaison staff of a bank, when carrying a portable monetary transaction device, are forced by a person of criminal intent to process the receipt of non-existent funds, the staff can secretly input a special code, such as (99*99), into the transaction device during the process of operating the device, that is, during the process of inputting the funds received data (account number, funds received, etc.) as part of the regular monetary transaction process. The central processing unit, upon receiving the special code, will not update the account file and will send back a false funds received processing text (funds received, update balance etc.) in such a way that the criminal will assume that the file has been update. That is, the data is printed out in the bank passbook by the monetary transaction device, which receives the false funds received processing text as if the processing of the funds received was completed in the normal manner, thereby ensuring the safety of the client liaison staff. Later, when the criminal attempts to withdraw funds from the bank by using the false funds received processing text printed out in the passbook, not only will it be impossible to withdraw funds from the bank, but also the fact that a crime has been committed will be exposed.

Further features and advantages of the present invention will be apparent from the ensuing description with reference to the accompanying drawings to which, however, the scope of the invention is in no way limited.

BRIEF DESCRIPTION OF THE DRAWINGS

FIG. 3, including 3A and 3B, illustrates a keyboard arrangement in the transaction safety system illustrated in FIG. 1;

FIG. 7A illustrates the client file in FIG. 6 and

FIG. 7B illustrates the error log file in FIG. 6;

FIG. 8A, including 8A-1 to 8B-2, and 8B are block diagram for one operating example of an ordinary deposit receipt/payment;

DESCRIPTION OF THE PREFERRED EMBODIMENTS

Figure 1:
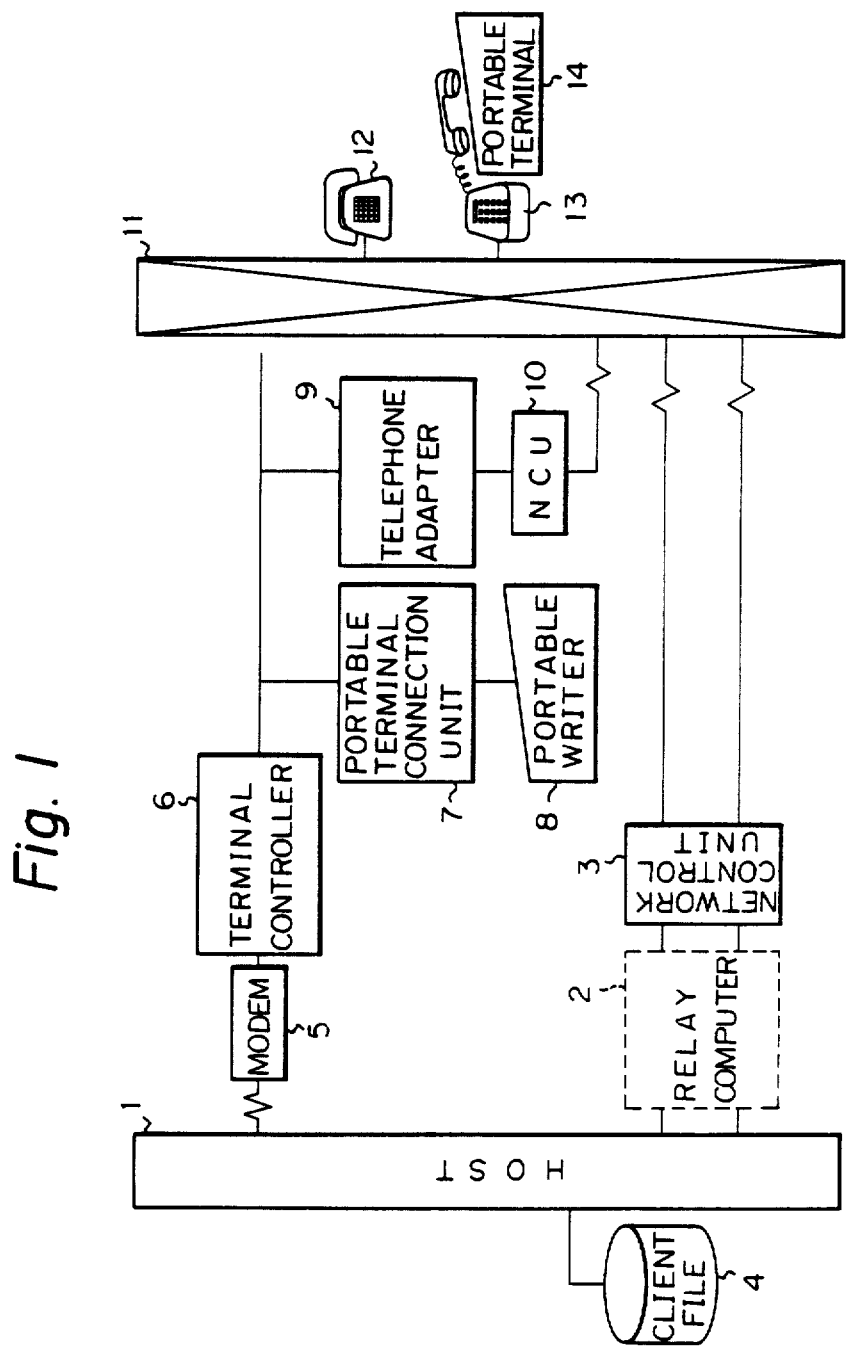
FIG. 1 illustrates one example of a monetary transaction system in which the present invention is applied.

FIG. 1 shows the system for monetary transaction in which a host computer 1, a relay computer 2, a network control unit 3, and a client file 4 are provided in the main office of a bank or business center, and a modem 5, a terminal controller 6, a portable terminal connection unit 7, a portable writer 8, a telephone adapter 9 and a network control unit 10 are provided in a branch office of the bank. A telephone exchange 11 is connected to the main office and to the branch office of the bank, and is further connected to a subscriber's telephone 12 or (via a subscriber's telephone 13) to a portable terminal 14. This portable terminal 14 is part of the transaction safety system according to the present invention.

In the system illustrated in FIG. 1, the portable writer 8 has the same functions as the portable terminal 14, but is provided in the branch office of the bank. The telephone exchange 11 can be connected either via the branch office of the bank or directly to the host computer 1.

As mentioned previously, because the portable terminal 14 is carried by the client liaison staff of the bank, there is always a risk that the staff will be forced into processing the receipt of non-existent funds, during the period when the staff are on the client's premises or when travelling between the bank and those premises.

Figure 2:
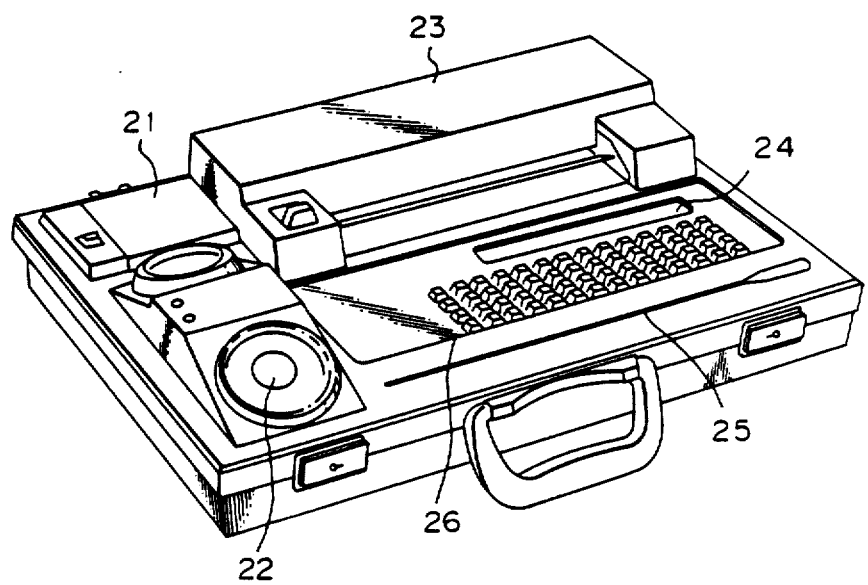
FIG. 2 is an external view of the transaction safety system according to the present invention.

FIG. 2 is an external view of the portable terminal 14 in FIG. 1. Visible in FIG. 2 are an electric power source (i.e., battery) 21, an acoustic coupler 22, a printer inserter 23, a liquid crystal display portion 24, a magnetic card read-out portion (a magnetic passbook read/write portion) 25 and a keyboard portion 26. FIG. 3 illustrates a keyboard arrangement for the portable terminal illustrated in FIG. 2. As illustrated in FIG. 3, the keyboard arrangement includes a ten key portion 29 and a function key portion 30.

Figure 4:
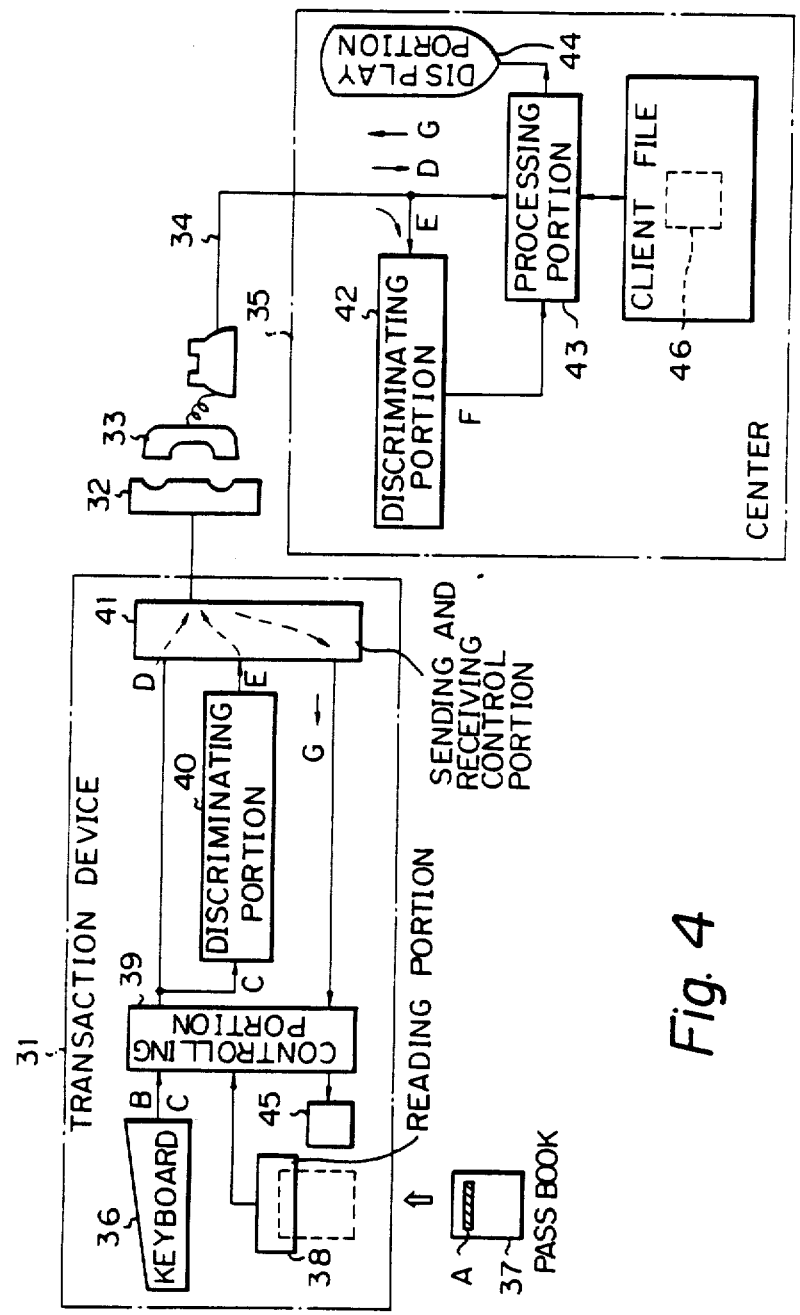
FIG. 4 is a block diagram of the transaction safety system according to the present invention.

FIG. 4 is a block diagram of the transaction safety system according to the present invention. In FIG. 4, a transaction device 31 includes a keyboard 36, a reading portion 38 which reads the passbook 37, a controlling portion 39, a discriminating portion 40 and a sending and receiving control portion 41. The output of the transaction device 31 is coupled via an acoustic coupler 32 a telephone handset 33 and a telephone line 34 to a processing center 35. The processing center 35 includes a discriminating portion 42, a processing portion 43, a display portion 44 and a client file 46.

Figure 5B:
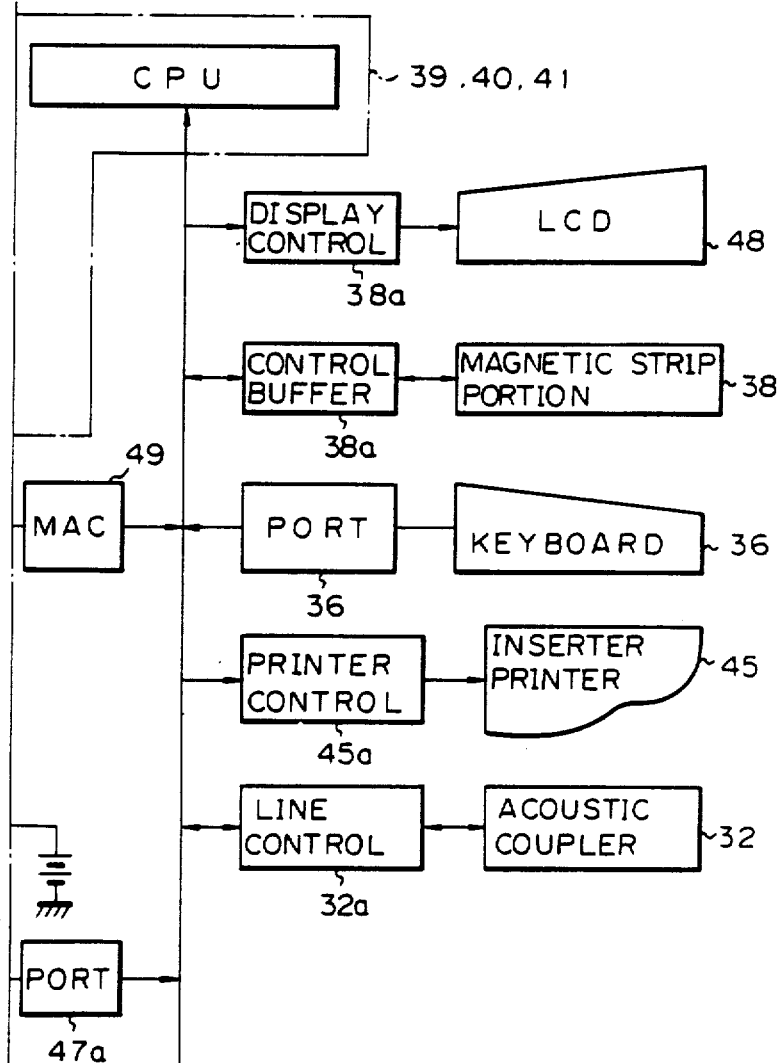
FIG. 5, including 5A and 5B, is a block diagram of an embodiment of the transaction device illustrated in FIG. 4.

FIG. 5 is a block diagram of an embodiment of the transaction device 31 in FIG. 4. As illustrated in FIG. 5, the control portion 39 and the discriminating portion 40 include a transaction control program, an input/output control program, a work area, a sending and receiving buffer, an identification storing portion, an SOS text, an input/output funds counter, and a journal record portion (account, item, amount, name and center number). The control portion 39, the discriminating portion 40 and the sending and receiving portion 41 are connected via a memory access controller 49 to a computer bus line. The computer bus line is connected via a display control 48a to a liquid crystal display portion 48. Other connections are made via a control buffer 38a to a magnetic strip (read/write) portion 38, via a port 36a to a keyboard 36, via a printer control portion 45a to an inserter printer or output portion 45, via a line control portion 32a to an acoustic coupler 32 and via an input/output port 47a to a clock 47.

Figure 6:
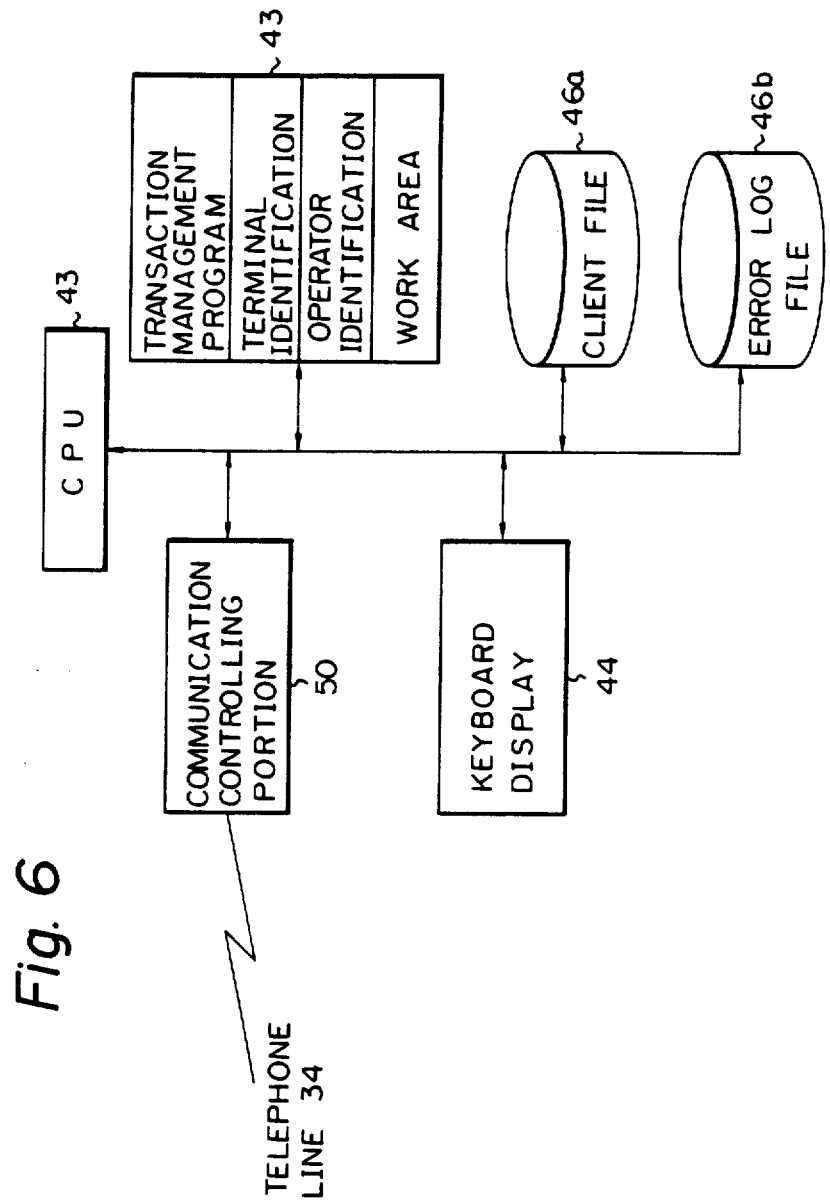
FIG. 6 is a block diagram of an example of the processing center in FIG. 4.

FIG. 6 is a block diagram of an example of the processing center 35 illustrated in FIG. 4. As in FIG. 6, the processing portion 43 includes a central processing unit (CPU) 43a, and a data storage 43b containing a transaction management program, a terminal identification, an operator identification and a work area. The portion display 44 is formed by a liquid crystal display and client file 46 in FIG. 4 is formed by an ordinal client file 46a and an error log file 46b. The processing center 35 is connected via a communication controlling portion 50 to a telephone line 34. The ordinal client file 46a is formed, as illustrated in FIG. 7A, of an account number, an address, a name, a balance and unrenewed data. The error log file 46b is formed, as illustrated in FIG. 7B, by defective account number and an accident, card lost, or a defective item, etc.

The client liaison staff of a bank carry this portable monetary transaction device 31 illustrated in FIG. 4, when visiting a client. When, during such a visit, the client proposes the transfer of funds to the bank (for example, a deposit), the bank staff connects this portable monetary transaction device 31 to the processing center 35, to input the desired data and to process the amount of funds received at the processing center 35. Thus, in the passbook for the account, the amount of funds which are received can be printed out and recorded and the passbook delivered to the client immediately. FIGS. 8A and 8B are block diagrams of the operation of an ordinary receipt/payment process. As illustrated in FIGS. 8A and 8B, the input process (for example, a time deposit) is as follows:

① Selection of the item: specifying a fixed time deposit

② Reading the passbook: inserting the passbook into the reading portion 38 and reading an identification code.

③ Inputting a deposit number: inputting a code indicating the deposit number and "NOTE 1."

④ Inputting a transaction code: inputting the transaction code.

⑤ Inputting a tax classification: inputting the numerical data.

⑥ Inputting the term.

⑦ Inputting a date of maturity: inputting the data for the maturity date.

⑧ Inputting a transaction classification: specifying that the interest is added to the principal, etc.

⑪ Inputting funds received: inputting the data indicating the amount of funds received.

In the event that the client liaison staff of the bank encounter a person with criminal intent and are forced to process an imaginary amount of funds received, if the staff refuse to carry out this false processing, it is quite likely that the personal safety of the staff will be endangered. Under this kind of pressure, obviously the staff will be obliged to connect the portable monetary transaction device 31 to the center 35 and input the data to the center 35 in accordance with the above process ① ~ ⑪ by operating the keyboard 36.

According to the present invention, in such a case the predetermined special code (SOS code, for example, "99*99") is secretly input during the input in process step ③ or ⑤. This prevents any access to the client file 46 at the processing center 35. At the same time, data for the false funds received is printed out in the passbook 37, and the passbook is delivered to the criminal.

In FIG. 4, after the client liaison staff of the bank has operated the keyboard 36, e.g., to specify a fixed time deposit, the passbook 37 is inserted into the reading portion 38 of the monetary transaction device 31 in order to read the identification code A. Next, when the deposit number code B is input on the keyboard 36, the special code C (for example, "99*99") is input. This special code C is fed via a controlling portion 39 to the discriminating portion 40. When the discriminating portion 40 detects this special code C, the discriminating portion 40 outputs an alarm signal E. Except for inputting the special code C, the client liaison staff proceed to input the data in accordance with the input processes ①~⑪ above. When the input of the data is completed, the sending and receiving control portion 41 sends the data of the false funds received D (in accordance with processes ①~⑪) and and acts as an alarm signal sending device to send the alarm signal E to the processing center 35. In the processing center 35, when the alarm signal E is included with the received data, the discriminating portion 42 identifies this alarm signal E and a control signal F is sent to a processing portion 43. When the processing portion 43 recognizes in an abnormal state due to the value of control signal F, the client account file 46, which was indicated by the input data, is not accessed and a display portion 44 displays that an abnormal state has occurred. After that, the processing text G, which indicates that the processing concerning the funds received is normally carried out, is sent back to the monetary transaction device 31. In the monetary transaction device 31, the funds received processing text G is received in the sending and receiving portion 41 and sent to the control portion 39, so that the printer 45 can print out the data of the funds received and the data of the updated balance etc., in the passbook 37.

The client liaison staff of the bank can thus escape from a difficult position by delivering this passbook to the person who has forced the staff to input an imaginary amount of funds. When the criminal trys to withdraw the funds by using this passbook, in which receipt of the imaginary funds is recorded, the crime is immediately discovered, because abnormal condition data is registered in the bank computer system concerning the account number of this passbook.

Figure 9A:
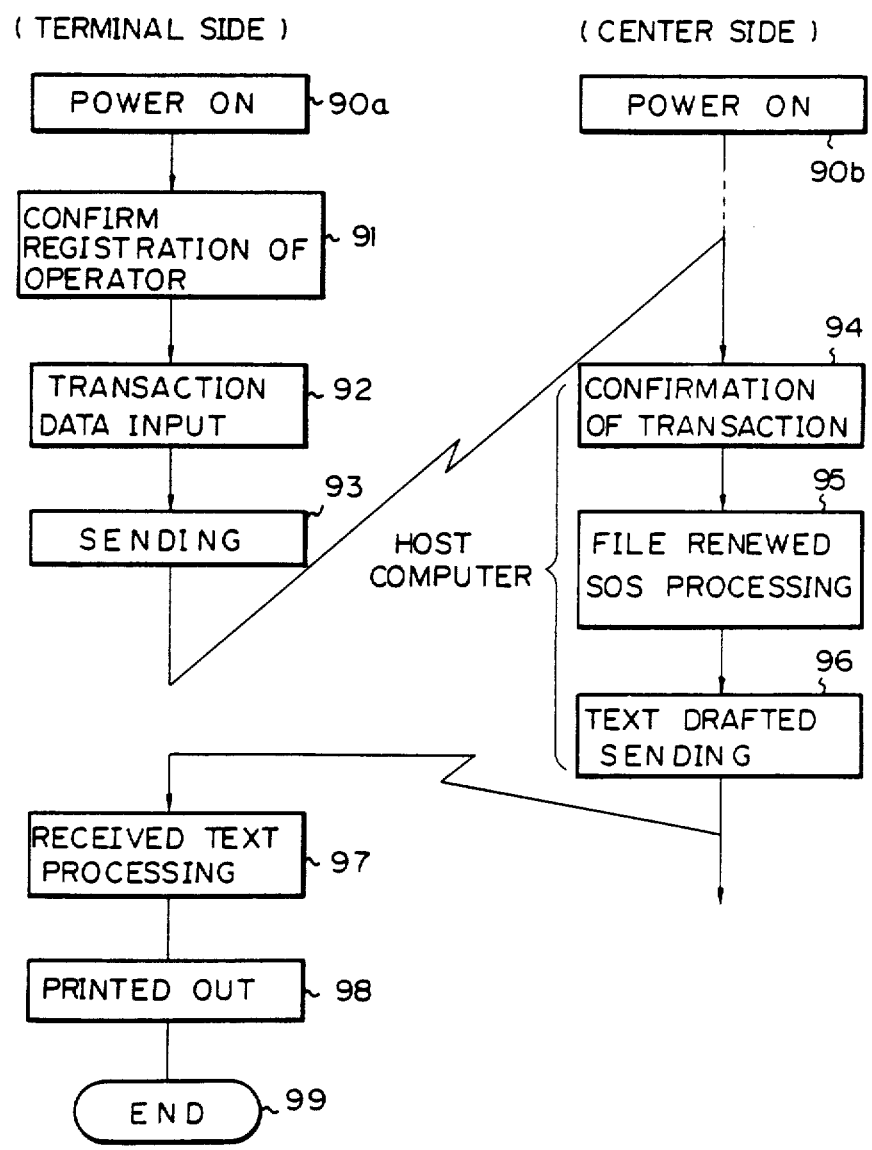
FIG. 9A is a flow chart of the operation of the system for a monetary transaction.

FIG. 9A is a flow chart of the operation of the monetary transaction system. Block 91 confirms the registration of the operator and, when the operator is registered, the transaction data is input in block 92, and sent to the processing center 35 in block 93 via a connecting portion of the transaction device. At the processing center a block 94 examines the transaction and the account file is updated in block 95, where the special code (SOS code) is processed. In block 96, the processing text is drafted and sent to a received text process block 97 in the terminal. The processed text in the block 97 is printed out in block 98 and the processing is ended.

Figures 2, 9B:
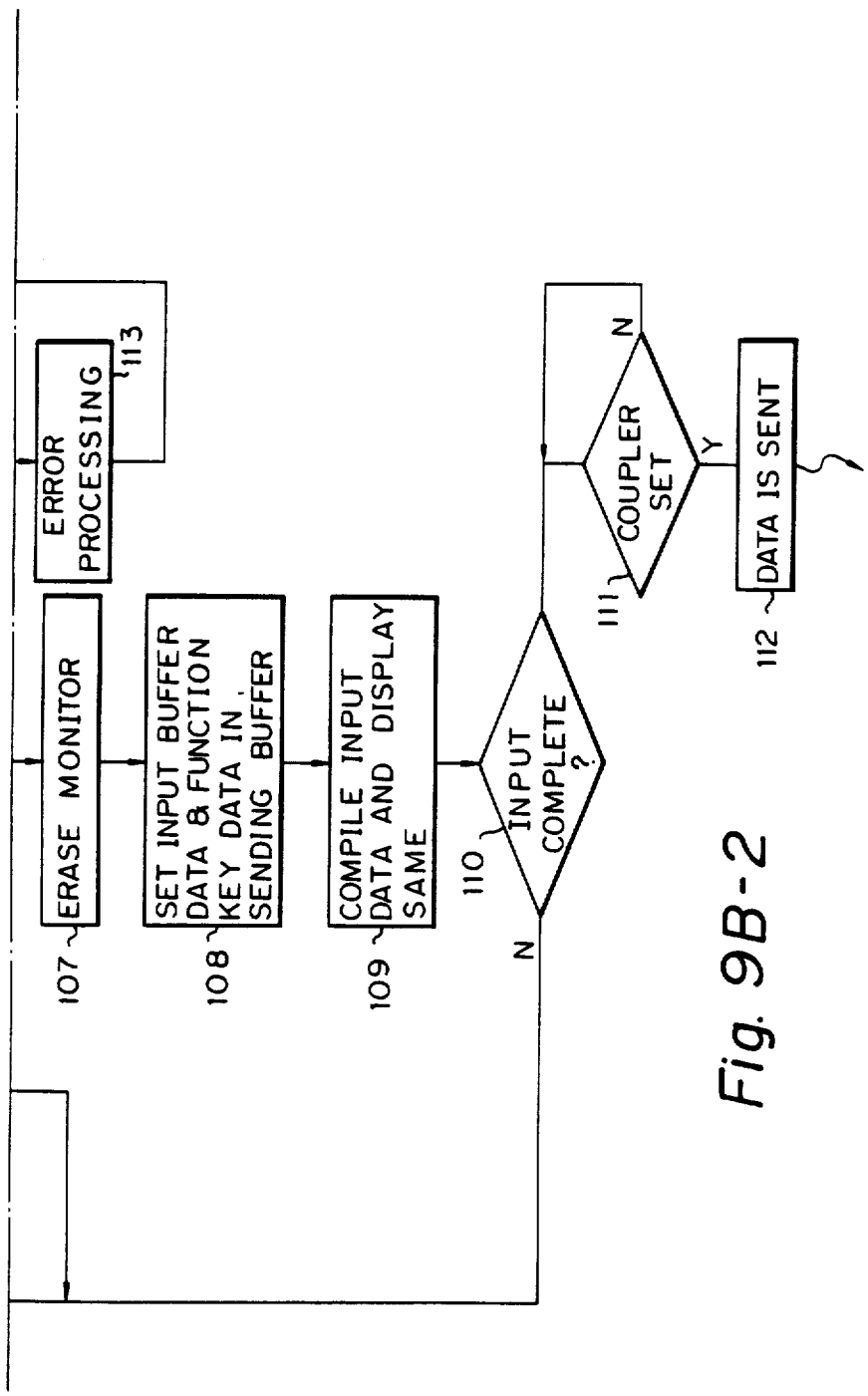
FIG. 9B is a flow chart for the input of the transaction data using the terminal in FIG. 9A.

FIG. 9B is a flow chart of the input of the transaction in FIG. 9A. The input data of a transaction (block 100) is stored in block 101 (a sending buffer), is displayed on a monitor in block 102 and the displayed item is examined in block 103 to determine whether or not it is a function key operation. When the item is a function key operation, block 103 transfers control to block 104 where the input data is examined to determine whether or not the special code is included. When the special code is included, it is loaded into the sending buffer 101. When the special code is not included, block 104 transfers control so that the numeric data is checked in block 106. When the numeric data is good, the monitor is erased in block 107 and the data in the input buffer and the function key data is loaded into the sending buffer in block 108. The input data is compiled and displayed in block 109 and is examined to determine whether or not the input is complete in block 110. When the input is complete, block 111 checks that the acoustic coupler is set to transmit data. In block 112, the data is then sent to the processing center. When block 106 judges that the numeric data is defective, an error processing is effected via block 113.

Figure 10A:
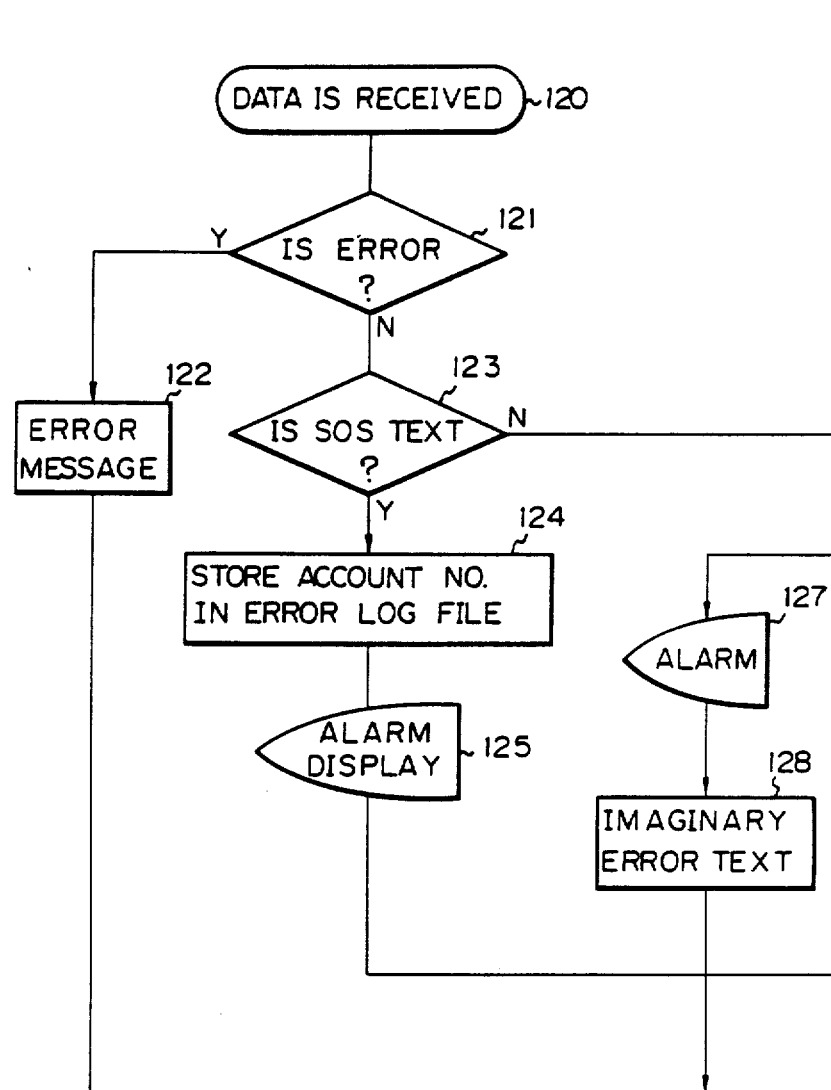
FIG. 10, including 10A and 10B, is a flow chart of the operation of the system for the monetary transaction at the processing center in FIG. 9A.

FIG. 10 is a flow chart of the operation at the processing center. Data is received in block 120 and block 121 then determines whether or not an error is included in the received data. When an error is included in the data, an error message is added in block 122. When an error is not included, the data is examined in block 123 for detecting whether or not the special code (SOS text) is included. When the special code is included in the data, the account number in the data is stored in the error log file in block 124 and an alarm is displayed in block 125. When a special code is not included, the identification and the operator of the input data is checked in block 126. When the data checked in block 126 is defective, the alarm is displayed on an alarm output device in block 127, an imaginary (error) text is drafted in block 128 and sent in block 133.

When the data checked in block 126 is good, the transaction is checked in block 129. If the result of the data check in block 129 is defective, the imaginary (error) text is drafted in block 130. When the result of the data check in block 129 is good, the account file is updated in block 131 and the text is drafted in block 132. When the text is drafted in block 132 for data containing the SOS text, the amount of the false funds received is included in the text. The text drafted in block 132, the error message drafted in block 122, or the error text drafted in block 130 are sent to the terminal via the send process in block 133.

As mentioned previously, according to the present invention, when forced to carry out the processing of a false amount of funds received in a monetary transaction system using a portable monetary transaction device, the client liaison staff can inform the processing center of an abnormal status while processing a transaction seemingly in a normal manner, keeping this fact secret from the criminal, and ensuring the personal safety of the staff. In addition the criminal will be prevented from later withdrawing the false funds from the bank.

We claim:

1. A transaction safety system in a data processing system which includes a transaction device, having an input portion and an output portion for providing a transaction result according to transaction data supplied by the input portion, operatively connected to a processing device, having a client file, for processing the transaction data received by the transaction device, the processing device operatively connected to a monitoring device, geographically separated from the transaction device, for monitoring transactions of the transaction device, said transaction safety system comprising:

alarm signal sending means, provided in the transaction device, for sending an alarm signal when the transaction data received by the transaction device includes a special code;

file control means, operatively connected to said alarm signal sending means, for preventing update of the client file when the alarm signal is received by the processing device;

result sending means for sending the transaction result to the transaction device in dependence upon the transaction data supplied by the input portion regardless whether the transaction data includes the special code and for sending the alarm signal to the monitoring means; and controlling means, operatively connected to said alarm signal sending means, for driving said alarm signal sending means when the special code is input on the input portion.

2. A transaction safety system according to claim 1, wherein said controlling means is provided in the transaction device, wherein the input portion, operatively connected to said controlling means, receives the transaction data concerning a transaction required by a client, and wherein said transaction device further comprises:
a connecting portion, operatively connected to said alarm signal sending means, for connecting the transaction device to the processing device via a subscriber's telephone line; and
a case for storing the input portion, the output portion and said connecting portion, said case being portable.

3. A transaction safety system according to claim 1, wherein the transaction device comprises:
said controlling means comprising a discriminating portion, operatively connected to said alarm signal sending means, for indicating whether the transaction data includes the special code; and
said alarm signal sending means, operatively connected to said discriminating portion and said file control means and actuated when the special code is indicated.

4. A transaction safety system in a data processing system which includes a transaction device, having an input portion and operatively connected to a processing device, the processing device having a client file and processing transaction data input via the transaction device, said transaction safety system comprising:
alarm signal sending means for sending an alarm signal when the transaction data input via the transaction device includes a special code;
file control means, operatively connected to said alarm signal sending means, for preventing update of the client file when the alarm signal is received by the processing device;
controlling means, operatively connected to said alarm signal sending means, for driving said alarm signal sending means when the special code is input via the input portion;
buffer means, provided in the transaction device and operatively connected to said controlling means and the input portion, for temporarily storing the transaction data input via the input portion; and
sending means, provided in the transaction device and operatively connected to said alarm signal sending means, said buffer means and connectable to the processing device, for sending the transaction data stored in said buffer means when the transaction data for a transaction is completely input, said controlling means storing the alarm signal in said buffer means when the special code is input, the alarm signal being sent together with the transaction data stored in said buffer means to the processing device by said sending means.

5. A transaction safety system according to claim 3, wherein the special code is included when necessary in the transaction data which is needed for processing a deposit transaction using a passbook, and
wherein said discriminating portion determines whether the special code is included in the transaction data which is input for the deposit transaction.

6. A transaction safety system according to claim 2, wherein the output portion includes a printing device, operatively connected to said controlling means, for printing a result of the transaction onto a passbook, said printing device printing the result of the transaction based on text output by the processing device and sent via the subscriber's telephone line.

7. A transaction safety system according to claim 1, wherein said controlling means is provided in the transaction device, and
wherein said file control means is provided in the processing device having the client file and comprises:
discriminating means, operatively connected to said alarm signal sending means, for determining whether the transaction data input via the transaction device is correct;
detecting means, operatively connected to said discriminating means, for detecting whether the alarm signal is included in the transaction data;
alarm output means, operatively connected to said detecting means, for outputting the alarm signal on a display device; and
means, operatively connected to said discriminating means, said detecting means and the transaction device, for sending a response text for the transaction data to the transaction device.

8. A transaction safety system, comprising:
a transaction device, comprising:
an input portion for inputting input data regarding a transaction;
an output portion for outputting text concerning the transaction;
a distinguishing portion, operatively connected to said input portion, for detecting whether the input data includes a special code; and
sending means, operatively connected to said distinguishing portion, for sending an alarm signal when said distinguishing portion detects the special code; and
a processing device having a client file, operatively connectable to said sending means, comprising:
alarm generating means, operatively connectable to said sending means, for generating an alarm when the alarm signal is received from said transaction device; and
text sending means, operatively connected to said alarm generating means and connectable to said output portion, for sending the text concerning the transaction to said transaction device, the text appearing to represent a normal transaction when the alarm signal is generated by said transaction device even though the client file is not updated.

9. A transaction safety system according to claim 8, wherein said transaction device and said processing device are connectable by a subscriber's telephone line and said transaction device further comprises a circuit connecting portion, operatively connected to said sending means and connectable to said processing device, by which said transaction device communicates with said processing device via the subscriber's telephone line, and wherein the output portion includes a printer, operatively connected to said sending means, for outputting the transaction result onto a passbook, the transaction result being printed and output in accordance with the text sent by said processing device via said circuit connecting portion.

10. A transaction safety system according to claim 9, wherein said transaction device further comprises:

buffer means, operatively connected to the input portion, for storing the transaction data input via said input portion, said sending means sending the transaction data stored in said buffer means to said processing device when the transaction data is completely input; and controlling means, operatively connected to said input portion, said distinguishing portion, said sending means, said printer and said buffer means, for controlling said distinguishing portion and said sending means to send the alarm signal by said sending means when the special code is input and for controlling said printer for output of the transaction result onto the passbook, regardless of whether the special code was input, in accordance with the text sent by said processing device.

11. A transaction safety system according to claim 8, wherein said processing device further comprises controlling means, operatively connected to said alarm generating means and said text sending means, for updating the client file based on the transaction data received from said transaction device and inhibiting update of said client file when the alarm signal is included in the transaction data, and wherein said text sending means sends the text concerning the transaction to said transaction device regardless of whether the alarm signal is included.

* * * * *